United States Patent
Boo et al.

(10) Patent No.: US 9,951,526 B2
(45) Date of Patent: Apr. 24, 2018

(54) MECHANICAL LOCKING SYSTEM FOR BUILDING PANELS

(71) Applicant: VALINGE INNOVATION AB, Viken (SE)

(72) Inventors: Christian Boo, Kagerod (SE); Stefan Stigert, Helsingborg (SE)

(73) Assignee: VALINGE INNOVATION AB, Viken (SE)

( * ) Notice: Subject to any disclaimer, the term of this patent is extended or adjusted under 35 U.S.C. 154(b) by 0 days.

(21) Appl. No.: 14/946,066

(22) Filed: Nov. 19, 2015

(65) Prior Publication Data

US 2016/0069088 A1 Mar. 10, 2016

Related U.S. Application Data

(63) Continuation of application No. 13/855,979, filed on Apr. 3, 2013, now Pat. No. 9,216,541.

(Continued)

(51) Int. Cl.
*E04F 15/02* (2006.01)
*B29C 65/00* (2006.01)
(Continued)

(52) U.S. Cl.
CPC ........ *E04F 15/02038* (2013.01); *B29C 66/41* (2013.01); *E04C 2/02* (2013.01);
(Continued)

(58) Field of Classification Search
CPC ... B29C 66/41; E04C 2/02; E04C 2/38; E04F 13/0894; E04F 15/02038; E04F 15/102; E04F 2201/0161; E04F 2201/043; E04F 2201/0547; Y10T 29/49623; Y10T 29/49629

See application file for complete search history.

(56) References Cited

U.S. PATENT DOCUMENTS

| 8,068 A | 4/1851 | Boynton |
| 87,853 A | 3/1869 | Kappes |

(Continued)

FOREIGN PATENT DOCUMENTS

| CA | 2456513 A1 | 2/2003 |
| DE | 299 22 649 U1 | 4/2000 |

(Continued)

OTHER PUBLICATIONS

U.S. Appl. No. 14/947,436, Pervan et al.
(Continued)

*Primary Examiner* — James M Ference
(74) *Attorney, Agent, or Firm* — Buchanan Ingersoll & Rooney P.C.

(57) ABSTRACT

Building panels provided with a mechanical locking system including a tongue, at first edge of a first building panel, cooperating with a tongue groove, at a second edge of an adjacent second building panel, for vertical locking of the building panels and a method for producing such building panels. The method includes the step of forming the tongue of material of the first edge. The insertion groove may have a sidewall at a third edge, which is adjacent the first edge, and may be open at a fourth edge, which is opposite the third edge.

17 Claims, 9 Drawing Sheets

Related U.S. Application Data

(60) Provisional application No. 61/620,246, filed on Apr. 4, 2012.

(51) Int. Cl.
*E04F 15/10* (2006.01)
*E04C 2/02* (2006.01)
*E04C 2/38* (2006.01)
*E04F 13/08* (2006.01)

(52) U.S. Cl.
CPC ............ *E04C 2/38* (2013.01); *E04F 13/0894* (2013.01); *E04F 15/102* (2013.01); *E04F 2201/0161* (2013.01); *E04F 2201/043* (2013.01); *E04F 2201/0547* (2013.01); *Y10T 29/49623* (2015.01); *Y10T 29/49629* (2015.01)

(56) References Cited

U.S. PATENT DOCUMENTS

| | | |
|---|---|---|
| 124,228 A | 3/1872 | Stuart |
| 213,740 A | 4/1879 | Conner |
| 274,354 A | 3/1883 | McCarthy et al. |
| 316,176 A | 4/1885 | Ransom |
| 634,581 A | 10/1899 | Miller |
| 861,911 A | 7/1907 | Stewart |
| 1,194,636 A | 8/1916 | Joy |
| 1,723,306 A | 8/1929 | Sipe |
| 1,743,492 A | 1/1930 | Sipe |
| 1,809,393 A | 6/1931 | Rockwell |
| 1,902,716 A | 3/1933 | Newton |
| 2,026,511 A | 12/1935 | Storm |
| 2,204,675 A | 6/1940 | Grunert |
| 2,277,758 A | 3/1942 | Hawkins |
| 2,430,200 A | 11/1947 | Wilson |
| 2,497,837 A | 2/1950 | Nelson |
| 2,596,280 A | 5/1952 | Nystrom |
| 2,732,706 A | 1/1956 | Friedman |
| 2,740,167 A | 4/1956 | Rowley |
| 2,863,185 A | 12/1958 | Riedi |
| 2,865,058 A | 12/1958 | Andersson |
| 2,872,712 A | 2/1959 | Brown |
| 2,889,016 A | 6/1959 | Warren |
| 3,023,681 A | 3/1962 | Worson |
| 3,077,703 A | 2/1963 | Bergstrom |
| 3,099,110 A | 7/1963 | Spaight |
| 3,147,522 A | 9/1964 | Schumm |
| 3,271,787 A | 9/1966 | Clary |
| 3,325,585 A | 6/1967 | Brenneman |
| 3,378,958 A | 4/1968 | Parks et al. |
| 3,396,640 A | 8/1968 | Fujihara |
| 3,512,324 A | 5/1970 | Reed |
| 3,517,927 A | 6/1970 | Kennel |
| 3,526,071 A | 9/1970 | Watanabe |
| 3,535,844 A | 10/1970 | Glaros |
| 3,572,224 A | 3/1971 | Perry |
| 3,579,941 A | 5/1971 | Tibbals |
| 3,720,027 A | 3/1973 | Christensen |
| 3,722,379 A | 3/1973 | Koester |
| 3,742,669 A | 7/1973 | Mansfeld |
| 3,760,547 A | 9/1973 | Brenneman |
| 3,760,548 A | 9/1973 | Sauer et al. |
| 3,778,954 A | 12/1973 | Meserole |
| 3,849,235 A | 11/1974 | Gwynne |
| 3,889,736 A * | 6/1975 | Firks ............ A47G 5/00 16/225 |
| 3,919,820 A | 11/1975 | Green |
| 3,950,915 A | 4/1976 | Cole |
| 3,998,015 A * | 12/1976 | Scott ............ E04C 2/043 156/45 |
| 4,030,852 A | 6/1977 | Hein |
| 4,064,571 A | 12/1977 | Phipps |
| 4,080,086 A | 3/1978 | Watson |
| 4,082,129 A | 4/1978 | Morelock |
| 4,100,710 A | 7/1978 | Kowallik |
| 4,107,892 A | 8/1978 | Bellem |
| 4,113,399 A | 9/1978 | Hansen, Sr. et al. |
| 4,169,688 A | 10/1979 | Toshio |
| 4,196,554 A | 4/1980 | Anderson |
| 4,227,430 A | 10/1980 | Janssen et al. |
| 4,299,070 A | 11/1981 | Oltmanns |
| 4,304,083 A | 12/1981 | Anderson |
| 4,426,820 A | 1/1984 | Terbrack |
| 4,447,172 A | 5/1984 | Galbreath |
| 4,512,131 A | 4/1985 | Laramore |
| 4,599,841 A | 7/1986 | Haid |
| 4,648,165 A | 3/1987 | Whitehorne |
| 5,007,222 A | 4/1991 | Raymond |
| 5,071,282 A | 12/1991 | Brown |
| 5,148,850 A | 9/1992 | Urbanick |
| 5,173,012 A | 12/1992 | Ortwein et al. |
| 5,182,892 A | 2/1993 | Chase |
| 5,247,773 A | 9/1993 | Weir |
| 5,272,850 A | 12/1993 | Mysliwiec et al. |
| 5,274,979 A | 1/1994 | Tsai |
| 5,344,700 A | 9/1994 | McGath et al. |
| 5,348,778 A | 9/1994 | Knipp et al. |
| 5,465,546 A | 11/1995 | Buse |
| 5,485,702 A | 1/1996 | Sholton |
| 5,548,937 A | 8/1996 | Shimonohara |
| 5,598,682 A | 2/1997 | Haughian |
| 5,618,602 A | 4/1997 | Nelson |
| 5,634,309 A | 6/1997 | Polen |
| 5,658,086 A | 8/1997 | Brokaw et al. |
| 5,671,575 A | 9/1997 | Wu |
| 5,694,730 A | 12/1997 | Del Rincon et al. |
| 5,755,068 A | 5/1998 | Ormiston |
| 5,899,038 A | 5/1999 | Stroppiana |
| 5,950,389 A | 9/1999 | Porter |
| 5,970,675 A | 10/1999 | Schray |
| 6,006,486 A | 12/1999 | Moriau |
| 6,029,416 A | 2/2000 | Andersson |
| 6,052,960 A | 4/2000 | Yonemura |
| 6,065,262 A | 5/2000 | Motta |
| 6,173,548 B1 | 1/2001 | Hamar et al. |
| 6,182,410 B1 | 2/2001 | Pervan |
| 6,216,409 B1 | 4/2001 | Roy et al. |
| 6,314,701 B1 | 11/2001 | Meyerson |
| 6,363,677 B1 | 4/2002 | Chen et al. |
| 6,385,936 B1 | 5/2002 | Schneider |
| 6,418,683 B1 | 7/2002 | Martensson et al. |
| 6,446,413 B1 | 9/2002 | Gruber |
| 6,449,918 B1 | 9/2002 | Nelson |
| 6,505,452 B1 | 1/2003 | Hannig |
| 6,553,724 B1 | 4/2003 | Bigler |
| 6,591,568 B1 | 7/2003 | Pålsson |
| 6,601,359 B2 | 8/2003 | Olofsson |
| 6,617,009 B1 | 9/2003 | Chen et al. |
| 6,647,689 B2 | 11/2003 | Pletzer et al. |
| 6,647,690 B1 | 11/2003 | Martensson |
| 6,651,400 B1 | 11/2003 | Murphy |
| 6,670,019 B2 | 12/2003 | Andersson |
| 6,685,391 B1 | 2/2004 | Gideon |
| 6,715,253 B2 | 4/2004 | Pervan |
| 6,763,643 B1 | 7/2004 | Martensson |
| 6,766,622 B1 | 7/2004 | Thiers |
| 6,769,219 B2 | 8/2004 | Schwitte et al. |
| 6,769,835 B2 | 8/2004 | Stridsman |
| 6,804,926 B1 | 10/2004 | Eisermann |
| 6,862,857 B2 | 3/2005 | Tychsen |
| 6,865,855 B2 | 3/2005 | Knauseder |
| 6,874,291 B1 | 4/2005 | Weber |
| 6,880,307 B2 | 4/2005 | Schwitte et al. |
| 6,918,220 B2 | 7/2005 | Pervan |
| 6,948,716 B2 | 9/2005 | Drouin |
| 7,021,019 B2 | 4/2006 | Knauseder |
| 7,051,486 B2 | 5/2006 | Pervan |
| 7,108,031 B1 | 9/2006 | Secrest |
| 7,121,058 B2 | 10/2006 | Pålsson |
| 7,127,860 B2 | 10/2006 | Pervan et al. |
| 7,137,229 B2 | 11/2006 | Pervan |
| 7,152,383 B1 | 12/2006 | Wilkinson et al. |
| 7,188,456 B2 | 3/2007 | Knauseder |
| 7,219,392 B2 | 5/2007 | Mullet et al. |

(56) References Cited

U.S. PATENT DOCUMENTS

| | | |
|---|---|---|
| 7,219,409 B2 | 5/2007 | Jecker |
| 7,251,916 B2 | 8/2007 | Konzelmann et al. |
| 7,257,926 B1 | 8/2007 | Kirby |
| 7,337,588 B1 | 3/2008 | Moebus |
| 7,377,081 B2 | 5/2008 | Ruhdorfer |
| 7,451,578 B2 | 11/2008 | Hannig |
| 7,454,875 B2 | 11/2008 | Pervan et al. |
| 7,516,588 B2 | 4/2009 | Pervan |
| 7,533,500 B2 | 5/2009 | Morton et al. |
| 7,556,849 B2 | 7/2009 | Thompson et al. |
| 7,568,322 B2 | 8/2009 | Pervan |
| 7,584,583 B2 | 9/2009 | Bergelin et al. |
| 7,614,197 B2 | 11/2009 | Nelson |
| 7,617,651 B2 | 11/2009 | Grafenauer |
| 7,621,092 B2 | 11/2009 | Groeke et al. |
| 7,634,884 B2 | 12/2009 | Pervan et al. |
| 7,637,068 B2 | 12/2009 | Pervan |
| 7,654,055 B2 | 2/2010 | Ricker |
| 7,677,005 B2 | 3/2010 | Pervan |
| 7,685,691 B2 | 3/2010 | Jecker |
| 7,716,889 B2 | 5/2010 | Pervan |
| 7,721,503 B2 | 5/2010 | Pervan et al. |
| 7,726,088 B2 | 6/2010 | Muehlebach |
| 7,757,452 B2 | 7/2010 | Pervan |
| 7,802,411 B2 | 9/2010 | Pervan |
| 7,806,624 B2 | 10/2010 | McLean et al. |
| 7,841,144 B2 | 11/2010 | Pervan et al. |
| 7,841,145 B2 | 11/2010 | Pervan et al. |
| 7,841,150 B2 | 11/2010 | Pervan |
| 7,856,789 B2 | 12/2010 | Eisermann |
| 7,861,482 B2 | 1/2011 | Pervan et al. |
| 7,866,110 B2 | 1/2011 | Pervan |
| 7,908,815 B2 | 3/2011 | Pervan et al. |
| 7,908,816 B2 | 3/2011 | Grafenauer |
| 7,930,862 B2 | 4/2011 | Bergelin et al. |
| 7,980,039 B2 | 7/2011 | Groeke |
| 7,980,041 B2 | 7/2011 | Pervan |
| 8,033,074 B2 | 10/2011 | Pervan |
| 8,042,311 B2 | 10/2011 | Pervan |
| 8,061,104 B2 | 11/2011 | Pervan |
| 8,079,196 B2 | 12/2011 | Pervan |
| 8,099,924 B2 | 1/2012 | Braun |
| 8,112,967 B2 | 2/2012 | Pervan et al. |
| 8,171,692 B2 | 5/2012 | Pervan |
| 8,181,416 B2 | 5/2012 | Pervan et al. |
| 8,234,830 B2 | 8/2012 | Pervan et al. |
| 8,302,361 B2 | 11/2012 | Braun et al. |
| 8,302,367 B2 | 11/2012 | Schulte |
| 8,336,272 B2 | 12/2012 | Prager et al. |
| 8,341,914 B2 | 1/2013 | Pervan et al. |
| 8,341,915 B2 | 1/2013 | Pervan et al. |
| 8,353,140 B2 | 1/2013 | Pervan et al. |
| 8,359,805 B2 | 1/2013 | Pervan et al. |
| 8,381,477 B2 | 2/2013 | Pervan et al. |
| 8,387,327 B2 | 3/2013 | Pervan |
| 8,448,402 B2 | 5/2013 | Pervan et al. |
| 8,499,521 B2 | 8/2013 | Pervan et al. |
| 8,505,257 B2 | 8/2013 | Boo et al. |
| 8,511,040 B2 | 8/2013 | Braun et al. |
| 8,528,289 B2 | 9/2013 | Pervan et al. |
| 8,544,230 B2 | 10/2013 | Pervan |
| 8,544,234 B2 | 10/2013 | Pervan et al. |
| 8,572,922 B2 | 11/2013 | Pervan |
| 8,596,013 B2 | 12/2013 | Boo |
| 8,627,862 B2 | 1/2014 | Pervan et al. |
| 8,640,424 B2 | 2/2014 | Pervan et al. |
| 8,650,826 B2 | 2/2014 | Pervan et al. |
| 8,677,714 B2 | 3/2014 | Pervan |
| 8,689,512 B2 | 4/2014 | Pervan |
| 8,707,650 B2 | 4/2014 | Pervan |
| 8,713,886 B2 | 5/2014 | Boo et al. |
| 8,733,065 B2 | 5/2014 | Pervan |
| 8,733,410 B2 | 5/2014 | Pervan |
| 8,763,341 B2 | 7/2014 | Pervan |
| 8,769,905 B2 | 7/2014 | Pervan |
| 8,776,473 B2 | 7/2014 | Pervan et al. |
| 8,844,236 B2 | 9/2014 | Pervan et al. |
| 8,857,126 B2 | 10/2014 | Pervan et al. |
| 8,869,485 B2 | 10/2014 | Pervan |
| 8,898,988 B2 | 12/2014 | Pervan |
| 8,925,274 B2 | 1/2015 | Pervan et al. |
| 8,959,866 B2 | 2/2015 | Pervan |
| 8,973,331 B2 | 3/2015 | Boo |
| 9,027,306 B2 | 5/2015 | Pervan |
| 9,051,738 B2 | 6/2015 | Pervan et al. |
| 9,068,360 B2 | 6/2015 | Pervan |
| 9,091,077 B2 | 7/2015 | Boo |
| 9,194,134 B2 | 11/2015 | Nygren et al. |
| 9,212,492 B2 | 12/2015 | Pervan et al. |
| 9,216,541 B2 | 12/2015 | Boo et al. |
| 9,238,917 B2 | 1/2016 | Pervan et al. |
| 9,284,737 B2 | 3/2016 | Pervan et al. |
| 9,309,679 B2 * | 4/2016 | Pervan .................. E04F 15/02 |
| 9,316,002 B2 | 4/2016 | Boo |
| 9,340,974 B2 | 5/2016 | Pervan et al. |
| 9,347,469 B2 | 5/2016 | Pervan |
| 9,359,774 B2 | 6/2016 | Pervan |
| 9,366,036 B2 | 6/2016 | Pervan |
| 9,376,821 B2 | 6/2016 | Pervan |
| 9,382,716 B2 | 7/2016 | Pervan et al. |
| 9,388,584 B2 | 7/2016 | Pervan et al. |
| 9,428,919 B2 | 8/2016 | Pervan et al. |
| 9,453,347 B2 | 9/2016 | Pervan |
| 9,458,634 B2 | 10/2016 | Derelov |
| 9,482,012 B2 | 11/2016 | Nygren et al. |
| 9,540,826 B2 | 1/2017 | Pervan et al. |
| 9,663,940 B2 | 5/2017 | Boo |
| 9,725,912 B2 | 8/2017 | Pervan |
| 9,771,723 B2 | 9/2017 | Pervan |
| 9,777,487 B2 | 10/2017 | Pervan et al. |
| 9,803,374 B2 | 10/2017 | Pervan |
| 9,803,375 B2 | 10/2017 | Pervan |
| 2002/0112433 A1 | 8/2002 | Pervan |
| 2002/0170258 A1 | 11/2002 | Schwitte et al. |
| 2003/0024199 A1 | 2/2003 | Pervan |
| 2003/0101681 A1 | 6/2003 | Tychsen |
| 2003/0180091 A1 | 9/2003 | Stridsman |
| 2004/0016196 A1 | 1/2004 | Pervan |
| 2004/0031227 A1 | 2/2004 | Knauseder |
| 2004/0068954 A1 | 4/2004 | Martensson |
| 2004/0128934 A1 | 7/2004 | Hecht |
| 2004/0139678 A1 | 7/2004 | Pervan |
| 2004/0168392 A1 | 9/2004 | Konzelmann et al. |
| 2004/0182036 A1 | 9/2004 | Sjoberg et al. |
| 2004/0211143 A1 | 10/2004 | Hannig |
| 2004/0244325 A1 | 12/2004 | Nelson |
| 2004/0250492 A1 | 12/2004 | Becker |
| 2005/0028474 A1 | 2/2005 | Kim |
| 2005/0050827 A1 | 3/2005 | Schitter |
| 2005/0160694 A1 | 7/2005 | Pervan |
| 2005/0210810 A1 | 9/2005 | Pervan |
| 2006/0070333 A1 | 4/2006 | Pervan |
| 2006/0101769 A1 | 5/2006 | Pervan |
| 2006/0156670 A1 | 7/2006 | Knauseder |
| 2006/0236642 A1 | 10/2006 | Pervan |
| 2006/0260254 A1 | 11/2006 | Pervan et al. |
| 2007/0006543 A1 * | 1/2007 | Engstrom ............... E04F 15/02 52/582.1 |
| 2007/0011981 A1 | 1/2007 | Eisermann |
| 2007/0028547 A1 | 2/2007 | Grafenauer |
| 2007/0193178 A1 | 8/2007 | Groeke et al. |
| 2008/0000186 A1 | 1/2008 | Pervan et al. |
| 2008/0000187 A1 | 1/2008 | Pervan et al. |
| 2008/0010931 A1 | 1/2008 | Pervan et al. |
| 2008/0010937 A1 | 1/2008 | Pervan et al. |
| 2008/0028707 A1 | 2/2008 | Pervan |
| 2008/0034708 A1 | 2/2008 | Pervan |
| 2008/0041008 A1 | 2/2008 | Pervan |
| 2008/0066415 A1 | 3/2008 | Pervan |
| 2008/0104921 A1 | 5/2008 | Pervan et al. |
| 2008/0110125 A1 | 5/2008 | Pervan |
| 2008/0134607 A1 | 6/2008 | Pervan |
| 2008/0134613 A1 | 6/2008 | Pervan |
| 2008/0134614 A1 | 6/2008 | Pervan |

(56) References Cited

U.S. PATENT DOCUMENTS

| | | |
|---|---|---|
| 2008/0155930 A1 | 7/2008 | Pervan et al. |
| 2008/0216434 A1 | 9/2008 | Pervan |
| 2008/0216920 A1 | 9/2008 | Pervan |
| 2008/0295432 A1 | 12/2008 | Pervan et al. |
| 2009/0019806 A1 | 1/2009 | Muehlebach |
| 2009/0019808 A1 | 1/2009 | Palsson et al. |
| 2009/0100782 A1 | 4/2009 | Groeke et al. |
| 2009/0133353 A1 | 5/2009 | Pervan et al. |
| 2009/0173032 A1 | 7/2009 | Prager et al. |
| 2009/0193741 A1 | 8/2009 | Capelle |
| 2009/0193748 A1 | 8/2009 | Boo et al. |
| 2009/0193753 A1 | 8/2009 | Schitter |
| 2009/0249733 A1 | 10/2009 | Moebus |
| 2010/0037550 A1 | 2/2010 | Braun |
| 2010/0051779 A1 | 3/2010 | McCary |
| 2010/0058590 A1 | 3/2010 | Braun |
| 2010/0173122 A1 | 7/2010 | Susnjara |
| 2010/0218450 A1 | 9/2010 | Braun et al. |
| 2010/0293879 A1 | 11/2010 | Pervan et al. |
| 2010/0300029 A1 | 12/2010 | Braun et al. |
| 2010/0300031 A1 | 12/2010 | Pervan et al. |
| 2010/0319290 A1 | 12/2010 | Pervan |
| 2010/0319291 A1 | 12/2010 | Pervan et al. |
| 2011/0016822 A1 | 1/2011 | Braun |
| 2011/0030303 A1 | 2/2011 | Pervan et al. |
| 2011/0041996 A1 | 2/2011 | Pervan |
| 2011/0056167 A1 | 3/2011 | Nilsson et al. |
| 2011/0088344 A1 | 4/2011 | Pervan et al. |
| 2011/0088345 A1 | 4/2011 | Pervan |
| 2011/0088346 A1 | 4/2011 | Hannig |
| 2011/0094178 A1 | 4/2011 | Braun |
| 2011/0154763 A1 | 6/2011 | Bergelin et al. |
| 2011/0167750 A1 | 7/2011 | Pervan |
| 2011/0167751 A1 | 7/2011 | Engstrom |
| 2011/0225922 A1 | 9/2011 | Pervan et al. |
| 2011/0252733 A1 | 10/2011 | Pervan |
| 2011/0258959 A1 | 10/2011 | Braun |
| 2011/0283650 A1 | 11/2011 | Pervan et al. |
| 2012/0017533 A1 | 1/2012 | Pervan et al. |
| 2012/0031029 A1 | 2/2012 | Pervan et al. |
| 2012/0036804 A1 | 2/2012 | Pervan |
| 2012/0067461 A1 | 3/2012 | Braun |
| 2012/0096801 A1* | 4/2012 | Cappelle ........... E04F 15/02038 52/592.1 |
| 2012/0151865 A1 | 6/2012 | Pervan et al. |
| 2012/0174515 A1 | 7/2012 | Pervan |
| 2012/0174520 A1 | 7/2012 | Pervan |
| 2012/0174521 A1 | 7/2012 | Schulte et al. |
| 2012/0192521 A1 | 8/2012 | Schulte |
| 2012/0279161 A1 | 11/2012 | Håkansson et al. |
| 2013/0008117 A1 | 1/2013 | Pervan |
| 2013/0008127 A1 | 1/2013 | Braun et al. |
| 2013/0014463 A1 | 1/2013 | Pervan |
| 2013/0019555 A1 | 1/2013 | Pervan |
| 2013/0036695 A1 | 2/2013 | Durnberger |
| 2013/0042562 A1 | 2/2013 | Pervan |
| 2013/0042563 A1 | 2/2013 | Pervan |
| 2013/0042564 A1 | 2/2013 | Pervan et al. |
| 2013/0042565 A1 | 2/2013 | Pervan |
| 2013/0047536 A1 | 2/2013 | Pervan |
| 2013/0055950 A1 | 3/2013 | Pervan et al. |
| 2013/0081349 A1 | 4/2013 | Pervan et al. |
| 2013/0111845 A1 | 5/2013 | Pervan |
| 2013/0145708 A1 | 6/2013 | Pervan |
| 2013/0160390 A1 | 6/2013 | Stockl |
| 2013/0160391 A1 | 6/2013 | Pervan et al. |
| 2013/0192158 A1 | 8/2013 | Cappelle et al. |
| 2013/0205710 A1 | 8/2013 | Brailsford et al. |
| 2013/0232905 A2 | 9/2013 | Pervan |
| 2013/0239508 A1 | 9/2013 | Pervan et al. |
| 2013/0263454 A1 | 10/2013 | Boo et al. |
| 2013/0263547 A1 | 10/2013 | Boo |
| 2013/0276398 A1 | 10/2013 | Hannig |
| 2013/0318906 A1 | 12/2013 | Pervan et al. |
| 2014/0007539 A1 | 1/2014 | Pervan et al. |
| 2014/0020324 A1 | 1/2014 | Pervan |
| 2014/0033634 A1 | 2/2014 | Pervan |
| 2014/0053497 A1 | 2/2014 | Pervan et al. |
| 2014/0059966 A1 | 3/2014 | Boo |
| 2014/0069043 A1 | 3/2014 | Pervan |
| 2014/0090335 A1 | 4/2014 | Pervan et al. |
| 2014/0109501 A1 | 4/2014 | Pervan |
| 2014/0109506 A1 | 4/2014 | Pervan et al. |
| 2014/0123586 A1 | 5/2014 | Pervan et al. |
| 2014/0150369 A1 | 6/2014 | Hannig |
| 2014/0190112 A1 | 7/2014 | Pervan |
| 2014/0208677 A1 | 7/2014 | Pervan et al. |
| 2014/0223852 A1 | 8/2014 | Pervan |
| 2014/0237931 A1 | 8/2014 | Pervan |
| 2014/0250813 A1 | 9/2014 | Nygren et al. |
| 2014/0260060 A1 | 9/2014 | Pervan et al. |
| 2014/0283477 A1 | 9/2014 | Hannig |
| 2014/0305065 A1 | 10/2014 | Pervan |
| 2014/0366476 A1 | 12/2014 | Pervan |
| 2014/0373478 A2 | 12/2014 | Pervan et al. |
| 2014/0373480 A1 | 12/2014 | Pervan et al. |
| 2015/0000221 A1 | 1/2015 | Boo |
| 2015/0013260 A1 | 1/2015 | Pervan |
| 2015/0059281 A1 | 3/2015 | Pervan |
| 2015/0089896 A2 | 4/2015 | Pervan et al. |
| 2015/0121796 A1 | 5/2015 | Pervan |
| 2015/0152644 A1 | 6/2015 | Boo |
| 2015/0167318 A1 | 6/2015 | Pervan |
| 2015/0211239 A1 | 7/2015 | Pervan |
| 2015/0233125 A1 | 8/2015 | Pervan et al. |
| 2015/0267418 A1 | 9/2015 | Vermeulen et al. |
| 2015/0267419 A1 | 9/2015 | Pervan |
| 2015/0300029 A1 | 10/2015 | Pervan |
| 2015/0330088 A1 | 11/2015 | Derelov |
| 2015/0337537 A1 | 11/2015 | Boo |
| 2016/0076260 A1 | 3/2016 | Pervan et al. |
| 2016/0153200 A1 | 6/2016 | Pervan |
| 2016/0168866 A1 | 6/2016 | Pervan et al. |
| 2016/0186426 A1 | 6/2016 | Boo |
| 2016/0194884 A1 | 7/2016 | Pervan et al. |
| 2016/0201336 A1 | 7/2016 | Pervan |
| 2016/0251859 A1 | 9/2016 | Pervan et al. |
| 2016/0251860 A1 | 9/2016 | Pervan |
| 2016/0281368 A1 | 9/2016 | Pervan et al. |
| 2016/0281370 A1 | 9/2016 | Pervan et al. |
| 2016/0326751 A1 | 11/2016 | Pervan |
| 2016/0340913 A1 | 11/2016 | Derelöv |
| 2017/0037641 A1 | 2/2017 | Nygren et al. |
| 2017/0081860 A1 | 3/2017 | Boo |
| 2017/0254096 A1 | 9/2017 | Pervan |
| 2017/0321433 A1 | 11/2017 | Pervan et al. |

FOREIGN PATENT DOCUMENTS

| | | |
|---|---|---|
| DE | 200 01 788 U1 | 6/2000 |
| DE | 10 2004 001 363 A1 | 8/2005 |
| DE | 10 2005 024 366 A1 | 11/2006 |
| DE | 20 2007 018 935 U1 | 10/2009 |
| DE | 10 2009 048 050 B3 | 1/2011 |
| DE | 10 2010 012 572 B3 | 7/2011 |
| EP | 0 974 713 A1 | 1/2000 |
| EP | 1 350 904 A2 | 10/2003 |
| EP | 1 350 904 A3 | 10/2003 |
| EP | 1 396 593 A2 | 3/2004 |
| EP | 1 420 125 A2 | 5/2004 |
| EP | 1 437 457 A2 | 7/2004 |
| EP | 1 640 530 A2 | 3/2006 |
| EP | 1 980 683 A2 | 10/2008 |
| EP | 2 034 106 A1 | 3/2009 |
| EP | 2 226 447 A1 | 9/2010 |
| ES | 2 327 502 T3 | 10/2009 |
| ES | 2 327 502 T5 | 3/2013 |
| WO | WO 96/23942 A1 | 8/1996 |
| WO | WO 96/27721 A1 | 9/1996 |
| WO | WO 98/21428 A1 | 5/1998 |
| WO | WO 98/58142 A1 | 12/1998 |
| WO | WO 00/20705 A1 | 4/2000 |
| WO | WO 00/47841 A1 | 8/2000 |
| WO | WO 01/02669 A1 | 1/2001 |

(56) References Cited

FOREIGN PATENT DOCUMENTS

| | | |
|---|---|---|
| WO | WO 01/02671 A1 | 1/2001 |
| WO | WO 01/38657 A1 | 5/2001 |
| WO | WO 01/44669 A2 | 6/2001 |
| WO | WO 01/44669 A3 | 6/2001 |
| WO | WO 01/48332 A1 | 7/2001 |
| WO | WO 01/51732 A1 | 7/2001 |
| WO | WO 01/51733 A1 | 7/2001 |
| WO | WO 01/75247 A1 | 10/2001 |
| WO | WO 01/77461 A1 | 10/2001 |
| WO | WO 01/88306 A1 | 11/2001 |
| WO | WO 01/98604 A1 | 12/2001 |
| WO | WO 02/103135 A1 | 12/2002 |
| WO | WO 03/012224 A1 | 2/2003 |
| WO | WO 03/016654 A1 | 2/2003 |
| WO | WO 03/025307 A1 | 3/2003 |
| WO | WO 03/038210 A1 | 5/2003 |
| WO | WO 03/069094 A1 | 8/2003 |
| WO | WO 03/089736 A1 | 10/2003 |
| WO | WO 2004/003314 A1 | 1/2004 |
| WO | WO 2004/016877 A1 | 2/2004 |
| WO | WO 2004/085765 A1 | 10/2004 |
| WO | WO 2005/003489 A1 | 1/2005 |
| WO | WO 2006/043893 A1 | 4/2006 |
| WO | WO 2006/104436 A1 | 10/2006 |
| WO | WO 2007/015669 A2 | 2/2007 |
| WO | WO 2007/015669 A3 | 2/2007 |
| WO | WO 2007/141605 A2 | 12/2007 |
| WO | WO 2008/004960 A2 | 1/2008 |
| WO | WO 2008/004960 A8 | 1/2008 |
| WO | WO 2008/017281 A1 | 2/2008 |
| WO | WO 2008/017301 A2 | 2/2008 |
| WO | WO 2008/017301 A3 | 2/2008 |
| WO | WO 2008/116623 A1 | 10/2008 |
| WO | WO 2009/013590 A2 | 1/2009 |
| WO | WO 2009/033623 A1 | 3/2009 |
| WO | WO 2009/116926 A1 | 9/2009 |
| WO | WO 2010/081532 A1 | 7/2010 |
| WO | WO 2010/086084 A1 | 8/2010 |
| WO | WO 2010/087752 A1 | 8/2010 |
| WO | WO 2010/100046 A1 | 9/2010 |
| WO | WO 2010/142671 A1 | 12/2010 |
| WO | WO 2011/001326 A2 | 1/2011 |
| WO | WO 2011/032540 A2 | 3/2011 |
| WO | WO 2011/038709 A1 | 4/2011 |
| WO | WO 2011/117179 A1 | 9/2011 |
| WO | WO 2012/084604 A1 | 6/2012 |
| WO | WO 2013/032391 A1 | 3/2013 |
| WO | WO 2013/191632 A1 | 12/2013 |

OTHER PUBLICATIONS

U.S. Appl. No. 14/973,179, Pervan.
International Search Report issued in PCT/SE2013/050366, dated Jun. 24, 2013, ISA/SE, Stockholm, SE, 5 pages.
Välinge Innovation AB, Technical Disclosure entitled "Mechanical locking for floor panels with Vertical Folding," IP.com No. IPCOM000179246D, Feb. 10, 2009, IP.com PriorArtDatabase, 59 pp.
Välinge Innovation AB, Technical Disclosure entitled "Mechanical locking for floor panels with a flexible bristle tongue," IP.com No. IPCOM000145262D, Jan. 12, 2007, IP.com PriorArtDatabase, 57 pages.
Pervan, Darko, et al., U.S. Appl. No. 14/947,436, entitled "Mechanical Locking of Floor Panels with a Vertical Snap Folding," filed Nov. 20, 2015.
Pervan, Darko, U.S. Appl. No. 14/973,179, entitled "Mechanical Locking System for Floor Panels," filed Dec. 17, 2015.
U.S. Appl. No. 15/541,909, Pervan.
U.S. Appl. No. 15/695,437, Pervan et al.
Pervan, Darko, U.S. Appl. No. 15/541,909, entitled "Mechanical Locking System for Floor Panels," filed Jul. 6, 2017.
Pervan, Darko, et al., U.S. Appl. No. 15/695,437, entitled "Mechanical Locking of Floor Panels with Vertical Snap Folding," filed Sep. 5, 2017.
U.S. Appl. No. 15/726,754, Pervan.
Pervan, Darko, U.S. Appl. No. 15/726,754, entitled "Mechanical Locking System for Floor Panels," filed Oct. 6, 2017.
U.S. Appl. No. 15/583,002, Boo.
Extended European Search Report dated May 23, 2016 in EP13772042.1, European Patent Office, Munich, DE, 9 pages.
Boo, Christian, U.S. Appl. No. 15/583,002 entitled "Building Panel With a Mechanical Locking System," filed May 1, 2017.

\* cited by examiner

MECHANICAL LOCKING SYSTEM FOR BUILDING PANELS

CROSS REFERENCE TO RELATED APPLICATIONS

The present application is a continuation of U.S. application Ser. No. 13/855,979, filed on Apr. 3, 2013, which claims the benefit of U.S. Provisional Application No. 61/620,246, filed on Apr. 4, 2012. The entire contents of U.S. application Ser. No. 13/855,979, U.S. Provisional Application No. 61/620,246 are hereby incorporated herein by reference in their entirety.

TECHNICAL FIELD

The present disclosure relates to a building panel such as a floor panel, a wall panel, a ceiling panel, a furniture component or the like, which is provided with a mechanical locking system, and a method for producing said building panel with said locking system.

TECHNICAL BACKGROUND

Building panels provided with a mechanical locking system comprising a displaceable and resilient tongue cooperating with a tongue groove for vertical locking is known and disclosed in, e.g., WO2006/043893. The tongue is a separate part and is made of, e.g., plastic, and positioned in an insertion groove at an edge of a panel. The tongue is pushed into the insertion groove during a vertical assembling of the panels and springs back into the tongue groove of an adjacent panel when the panels have reached a locked position.

Also known is a locking system for panels comprising a tongue, which is slightly longer than the width of a panel, see, e.g., WO2008/004960, and cooperates with a tongue groove for vertical locking. The tongue is a separate part and is inserted in a displacement groove. The panels may be assembled by a vertical movement and the tongue is pressed between long edges of two adjacent panels and bent along its length direction.

Although the description relates to floor panel, the description of techniques and problems thereof is applicable also for other applications, such as panels for other purposes, for example wall panels, ceiling panels, furniture etc.

A drawback with the known system is that a separate tongue must be produced and special inserting machines are required to position the tongue in the insertion groove with high precision.

The above description of various known aspects is the applicant's characterization of such, and is not an admission that any of the above description is considered as prior art.

SUMMARY

It is an object of certain embodiments of the present disclosure to provide an improvement over the above described techniques and known art.

A further object is to provide a locking system and a method to produce a locking system, which comprises a tongue that may be formed out of the edge of the building panel. Such a system simplifies the production since no loose and additional parts are necessary to produce and to position at the correct position in the locking system.

Another object is to provide a more efficient production method, which requires a less complicated production equipment.

At least some of these and other objects and advantages that will be apparent from the description have been achieved by a method for producing a locking system at edges of building panels. The locking system may comprise a tongue, at first edge of a first building panel, cooperating with a tongue groove, at a second edge of an adjacent second building panel, for vertical locking of the building panels. The method, which is a first aspect of the disclosure, may comprise the steps of:

forming material of the first edge to obtain at least parts of the outer shape of the tongue;

forming an insertion groove at the first edge, wherein said insertion groove is sidewardly open and extends in the horizontal direction; and displacing the tongue at least partly into the insertion groove.

The forming of the insertion groove and the tongue is preferably made in a production line comprising mechanical cutting devices, such as milling tools. The displacement of the tongue into the insertion groove is preferably made in the same production line. The tongue may be displaced by a device, which in a first step displaces the tongue in a vertical direction and in a second step displaces the tongue in a horizontal direction and into the insertion groove.

The parts of the outer shape of the tongue may be formed at an upper part of the first edge, preferably above the insertion groove.

The insertion groove may be formed below the upper part of the first edge and the tongue may be displaced downwards and into the insertion groove.

The method may furthermore comprise the step of forming a connection part between the tongue and an upper edge of the first edge.

The method may comprise the step of forming a connection part by forming a groove between an upper edge of the first edge and outer parts of the tongue. The connection part may have the advantage that the tongue is in fixed position until the tongue is displaced.

The method may comprise the step of breaking the connection part by the displacement of the tongue. The connection part may also be cut off, preferably in connection with the displacement of the tongue.

The method may comprise the step of forming the tongue groove, at the second edge.

An inner groove may be formed throughout the tongue, between the tongue and the first edge of the building panel, in order to obtain a resilient tongue part. The inner groove may extend in the longitudinal direction of the tongue and between a first and a second protruding part of the tongue, at the third and the fourth edge of the building panel respectively. The resilient tongue part may extend from the first to the second protruding part. Before the tongue is displaced into the insertion groove the protruding parts may function as connection parts as described above.

The method may comprise the step of forming a sidewall in the insertion groove at a third edge of the first building panel, which is adjacent the first edge, and forming an opening of the insertion groove at a fourth edge at, which is opposite the third edge and adjacent the first edge. The tongue may be displaced to a position in which a pressing part of the tongue protrudes through the opening of the insertion groove. This position has also a displacement of the tongue in a direction along the first edge of the building panel.

The tongue may, in a locked position of the first and second edge, be pressed between the sidewall and an edge of an adjacent building panel, such that the tongue bends and a part of the tongue is pushed into the tongue groove.

The tongue may essentially have the same length as the length of the first edge.

The method may comprise the step of forming a locking element at the first edge and a locking groove at the second edge or a locking element at the second edge and a locking groove at the first edge, wherein said locking element and locking groove are configured to cooperate for locking of the first and the second edge in the horizontal direction.

The production steps above may be performed in any order. The building panel may also be positioned upside down in the production line.

The locking system is preferably formed by mechanical cutting, such as milling, drilling, cutting by knife and/or sawing, of the edges of the building panels.

A second aspect of the disclosure is building panels, which preferably are produced according to an embodiment of the first aspect, provided with a mechanical locking system. The locking system may comprise a tongue, at first edge of a first building panel, cooperating with a tongue groove, at a second edge of an adjacent second building panel, for vertical locking of the building panels. The tongue is preferably produced of material of the first edge. The tongue may be at least partly positioned in an insertion groove at the first edge.

The tongue may be displaceable in the insertion groove to enable a vertical assembling of the first and the second edge. An embodiment may have a resilient part between the displaceable tongue and a bottom wall of the insertion groove. The resilient part makes it possible to push the displaceable tongue into insertion groove, by an edge of the second edge, during a vertical assembling of the first and the second edge. The tongue springs back and into the tongue groove when the first and the second building panel have reached a locked position. The embodiment with the resilient part is particularly useful for building panels with edges comprising a rigid material, such as solid wood. A resilient part may not be necessary for building panels with edges comprising a resilient material, such as plastic and vinyl. For such building panels it may be possible to configure a tongue, which is compressible enough to be pushed into insertion groove during the vertical assembling.

The displaceable tongue may, in another embodiment, be configured such that when pressed between a sidewall in the insertion groove and an edge of an adjacent third building panel the tongue bends and a part of the tongue is pushed into the tongue groove. This solution is particularly useful for building panels with edges comprising wood, such as HDF or MDF.

The sidewall may be arranged in the insertion groove at a third edge of the first building panel, which is adjacent the first edge and the insertion groove may have an opening at a fourth edge, which is opposite the third edge and adjacent the first edge. The displaceable tongue may be positioned such that a press part of the displaceable tongue protrudes through the opening. Such a position improves the possibilities to apply a force on the press part.

Another embodiment comprises a fixed tongue, which preferably is arranged firmly in the insertion groove. The fixed tongue comprises a protruding part, which protrudes outside the upper edge of the first edge and cooperates with the tongue groove for the vertical locking. A first and a second edge provided with a locking system comprising the fixed tongue may be assembled by an angular movement.

This embodiment is particularly advantageous for thin building panels, preferably with a thickness in the range of about 3-7 mm or more preferably in the range of about 4-6 mm. A reason is that it's easier to produce a locking system, which comprises a displaceable tongue, at the edge of a thicker building panel than at the edge of a thinner building panel. The tools for forming a locking system with a displaceable tongue require more space and material than the tools for forming a locking system with a fixed tongue. This embodiment is particularly useful for plastic and vinyl tiles, which normally have a thin thickness.

Embodiments of the locking system and the building panels in the above first and the second aspect may comprise the features described below.

A contact surface of the tongue groove may cooperate, for the vertical locking, with a contact surface of the tongue.

The contact surface may be positioned such that when the displaceable tongue springs back and into the tongue groove, during a vertical assembling of the building panels, the tongue is prevented to reach its original position. The contact surface of the tongue asserts a force against the contact surface of the tongue groove in order to avoid a play between the panels.

The contact surface may be positioned such that when the displaceable tongue is pushed into the tongue groove the contact surface of the tongue asserts a force against the contact surface of the tongue groove in order to avoid a play between the panels.

The locking system may comprise a locking element, preferably arranged on a locking strip, at the first edge of the first panel and a locking groove at the second edge of the second panel or locking groove at the first edge of the first panel and a locking element at the second edge of the second panel. Said locking element and locking groove cooperate, for locking the panels horizontally.

The first and the second building panel are preferably essentially equal, thus an edge opposite said first edge of the first panel is provided with the same parts of the locking system as said second edge of the second panel.

The panels may be square-shaped and the edges between said first and said opposite edge are preferably provided with a locking system, which enables assembling to an adjacent panel by an angling movement.

The insertion groove may be filled with a resilient material or part, such as plastic or rubber, to improve the resilient properties of the displaceable part and/or to make the locking system stronger.

The building panel may be a floor panel, a wall panel, a ceiling panel, a furniture component or the like.

The core of the building panels may be a wood-based core, preferably made of MDF, HDF, OSB, WPC, or particleboard or of plastic, e.g., vinyl or PVC.

The edge of the panels, of which the locking system may be made, may comprise the core material.

BRIEF DESCRIPTION OF THE DRAWINGS

The present disclosure will by way of example be described in more detail with reference to the appended schematic drawings, which shows embodiments of the present disclosure.

DETAILED DESCRIPTION

Figure 1:
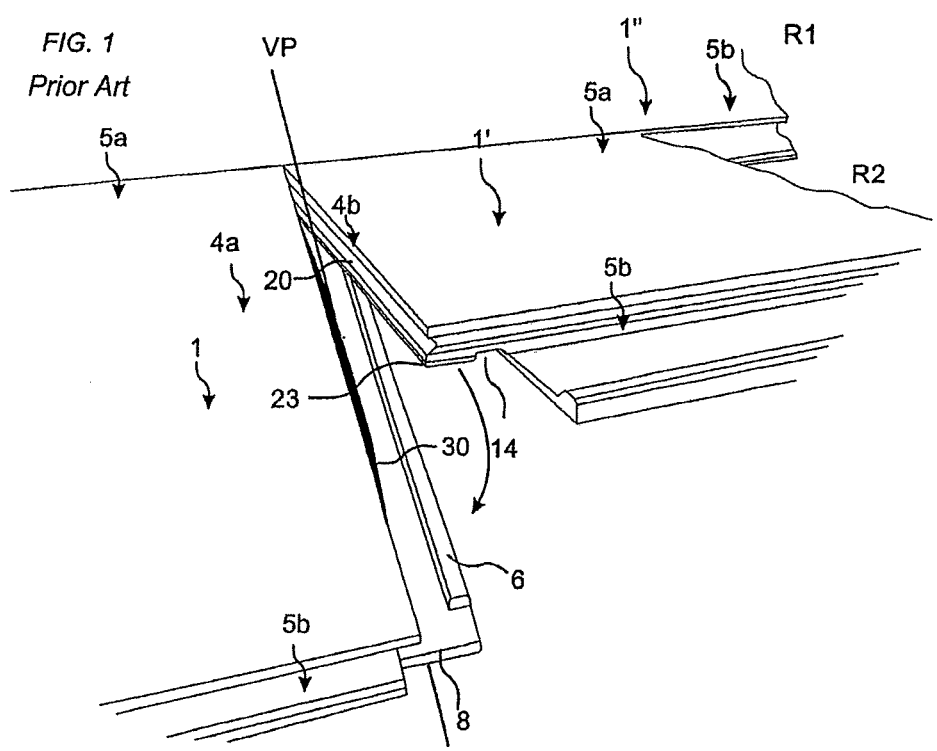
FIG. 1 shows a known locking system with a separate and resilient tongue.

A known locking system for building panels, which comprises a displaceable and resilient tongue 30, at a first edge 4a of a first panel 1, cooperating with a tongue groove 20, at a second edge 4b of a second panel 1', for vertical locking of the first and a second edge 4a, 4b, is shown in FIG. 1. The tongue 30 is a separate part and is made of, e.g., plastic, and is arranged in an insertion groove at the first edge 4a. The tongue 30 is pushed into the insertion groove during a vertical assembling of the short edges 4a, 4b of the panels and springs back into the tongue groove 20, when the panels have reached a locked position. The locking system comprises at the first edge a locking strip 8 with a protruding locking element 6, which cooperates with a locking groove 14 at the second edge. A third and a fourth edge 5a, 5b of the panels 1', 1', 1" are provided with a locking system, which enables assembling to of panels in a first and second row R1, R2 by an angling movement, to obtain a simultaneous locking of adjacent edges 5a, 5b, 4a, 4b.

Figure 2A:
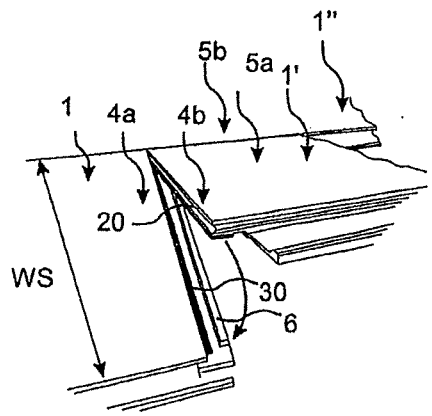
FIGS. 2a-c show a known locking system with a separate and displaceable tongue.
Figure 2B:
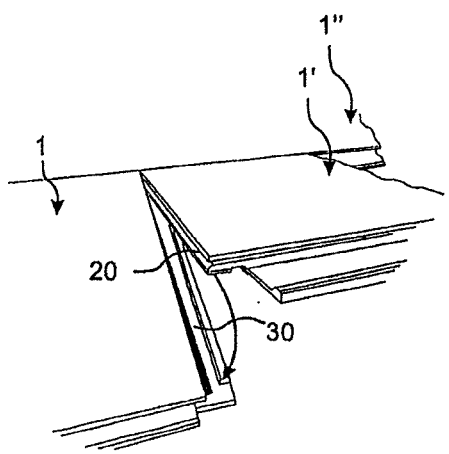
Figure 2C:
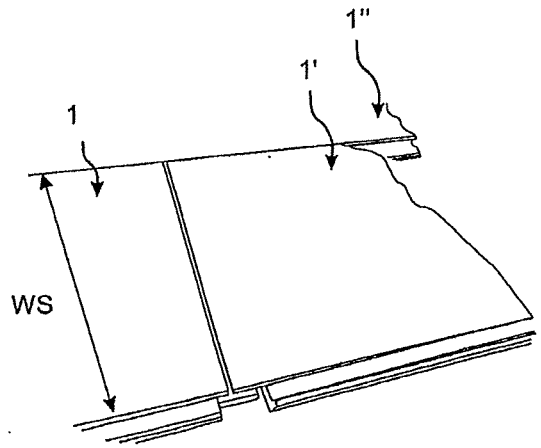

FIGS. 2a-c show simultaneously assembling of adjacent long and short edges 5a, 5b, 4a, 4b in three steps from FIG. 2a to FIG. 2c. The second panel 1' is angled down along its first long edge 5a, at a second long edge 5b of a third panel 1", and the second edge 4b of the second panel 1' is simultaneous lowered vertically to be connected to the first edge 4a of the first panel 1. The tongue 30 is gradually pushed into the insertion groove, see FIG. 2b, and spring back into the tongue groove 20 when the first, the second and the third panels 1, 1', 1" have reached a locked position, see FIG. 2c.

Figure 3A:
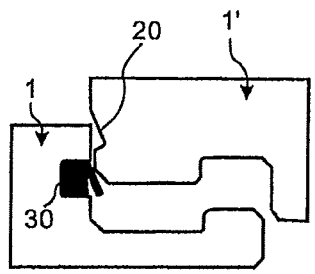
FIGS. 3a-c show cross-sections of known locking systems with a separate and displaceable tongue.
Figure 3A:
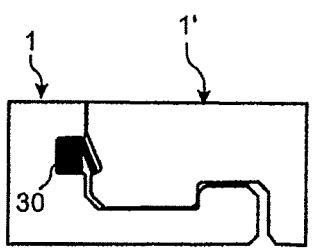
Figure 3B:
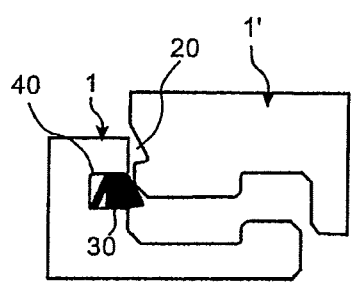
Figure 3B:
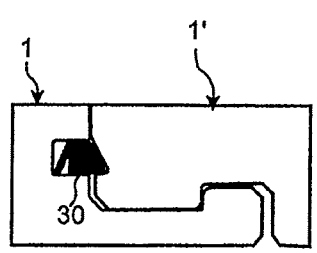
Figure 3C:
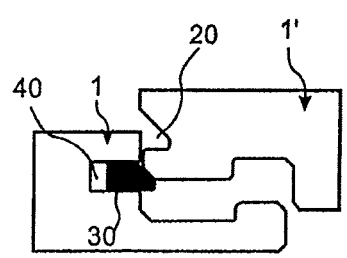
Figure 3C:
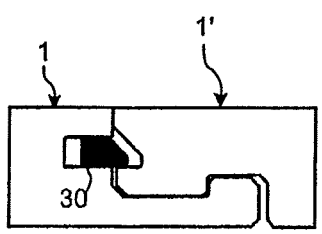
Figure 4A:
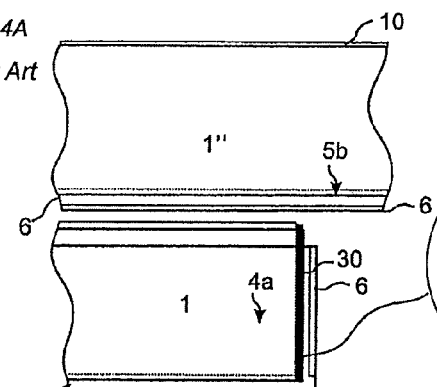
FIGS. 4a-f show cross-sections and top views of known locking systems with a separate and displaceable tongue.
Figure 4B:
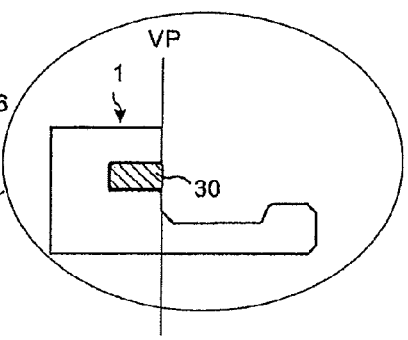
Figure 4C:
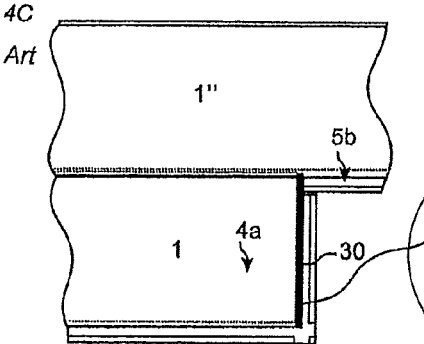
Figure 4D:
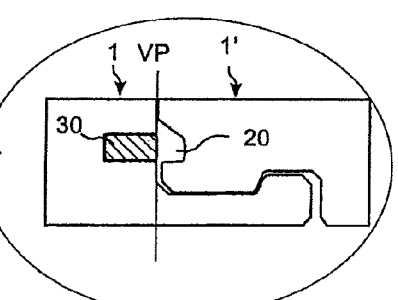
Figure 4E:
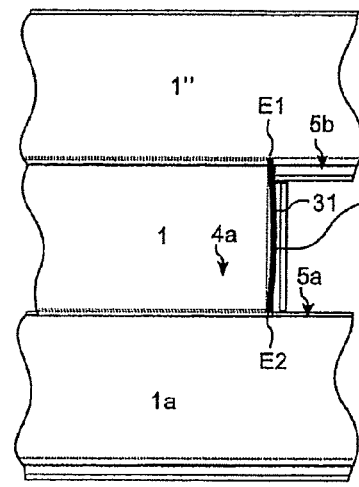
Figure 4F:
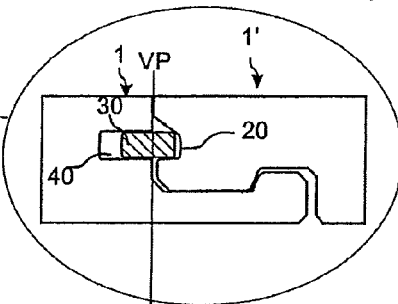

FIGS. 3a-c show cross sections of different embodiments of the known displaceable and resilient tongue 30 during assembling of two adjacent short edges. The panel with the tongue groove is lowered in relation to the panel with tongue 30, which is pushed into the insertion groove 40 by the lowered panel. The tongue springs back, and into the tongue groove, when the panels has reached a locked position, and locks the panels vertically.

FIGS. 4a-f discloses another known embodiment, comprising a displaceable and resilient tongue 30, during assembling of a first and a second edge 4a, 4b of a first and a second panels 1, 1'. This embodiment is similar to the locking system shown in FIGS. 1-3, but the displaceable and resilient tongue 30 that locks automatically by a spring effect during the vertical movement is replaced by a displaceable and resilient tongue 30 that locks the first and the second edge 4a, 4b, when a third 1" and a forth 1'" building panel are assembled at the third and the forth edge respectively of the first panel 1. The displaceable and resilient tongue 30 is, in this embodiment, longer than the width of the front face of the first and the second panel 1, 1'. A third and fourth edge 5a, 5b of the third and fourth building panel 1", 1'" respectively, apply a force at outer parts E1, E2 of the displaceable and resilient tongue 30. The force bends the displaceable and resilient tongue 30 and a part is pushed into the tongue groove 20 at the second edge of the second panel 1'.

Embodiments of the disclosure are shown in FIGS. 5-9. A locking system is formed at a first and a second edge 4a, 4b of a first and second panel 1, 1' for locking the first and the second edge 4a, 4b in a vertical and/or horizontal direction. Embodiments of the locking system comprise a displaceable or compressible tongue that enables assembling of the first and the second edge 4a, 4b by a vertical movement, see FIGS. 5a-c, 6a-c and 7a-c. Another embodiment, which may comprise a fixed tongue, enables assembling of building panels at the adjacent edges by an angular movement, see FIGS. 8a-8c. The locking system is preferably formed by mechanical cutting, such as milling, drilling, cutting by knife and/or sawing, of the edges of the building panels.

Figure 5A:
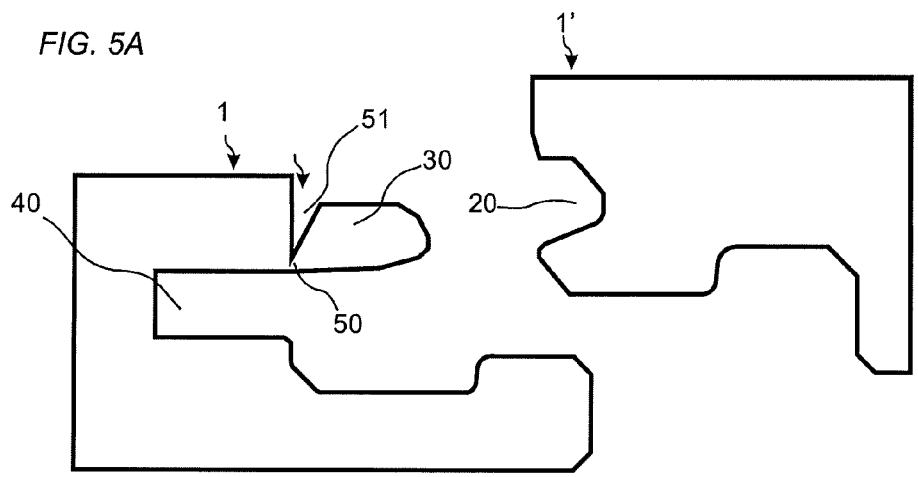
FIGS. 5a-c show an embodiment of the building panels.

FIG. 5a discloses a tongue 30, which is formed of material of a first edge of first building panel 1 and at an upper part of the first edge. A tongue groove is formed at a second edge of a second building panel 1'. The tongue 30 is configured to cooperate, in a locked position of the first edge and the second edge see FIG. 5c, with the tongue groove 20 for vertical locking of the first and the second edge.

A connection part 50 may be formed between outer part of the tongue 30 and an upper edge of the first edge. The connection part 50 is preferably formed by making a groove 51, e.g., by cutting, between the outer part of the tongue 30 and an upper edge of the first edge. The connection part keeps the tongue in the correct position before the tongue is displaced.

Figure 5B:
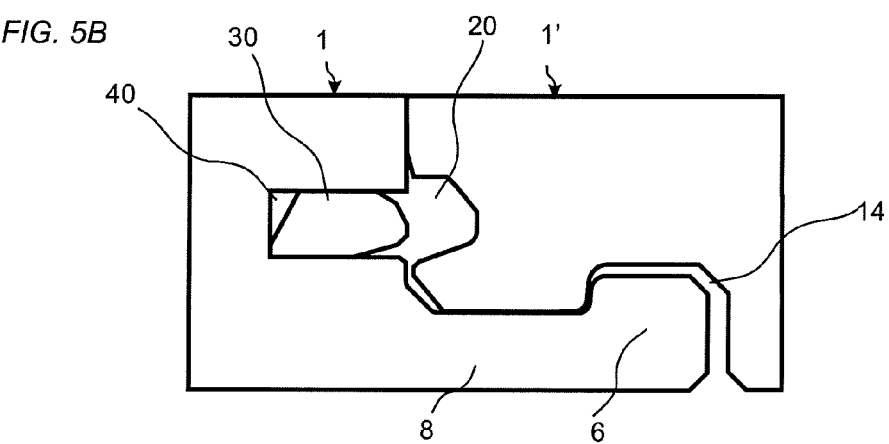

An insertion groove 40 is formed below the upper part and the tongue 30 is displaced into the insertion groove 40, see FIG. 5b.

Figure 5C:
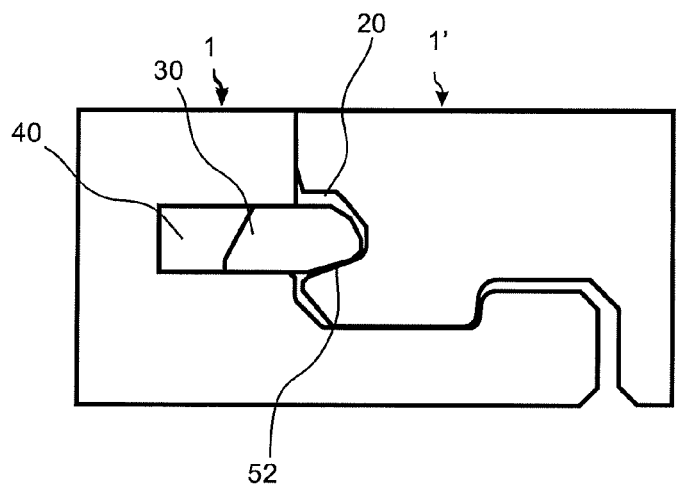

The tongue 30 is displaced into the tongue groove 20 during assembling of the first and the second edge, see FIG. 5c. A contact surface of the tongue is pressed against a contact surface 52 of the tongue groove 20.

An embodiment may have a resilient part (not shown) between the tongue 30 and a bottom wall of the insertion groove 40. The resilient part makes it possible to push the tongue 30 into insertion groove, by an edge of the second edge, during a vertical assembling of the first and the second edge. The tongue springs back and into the tongue groove when the first and the second building panel have reached a locked position.

A locking strip 8 with a vertically protruding locking element 6 is formed at the edge of the first building panel. The locking element 6 cooperates with a locking groove 14, formed at the edge of the second building panel 1', for horizontal locking of the first and second edge.

Figure 6A:
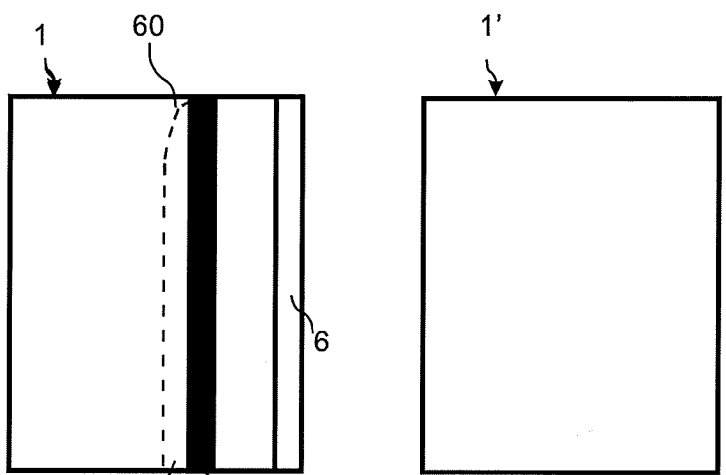
FIGS. 6a-c show top views of an embodiment of the building panels.
Figure 6B:
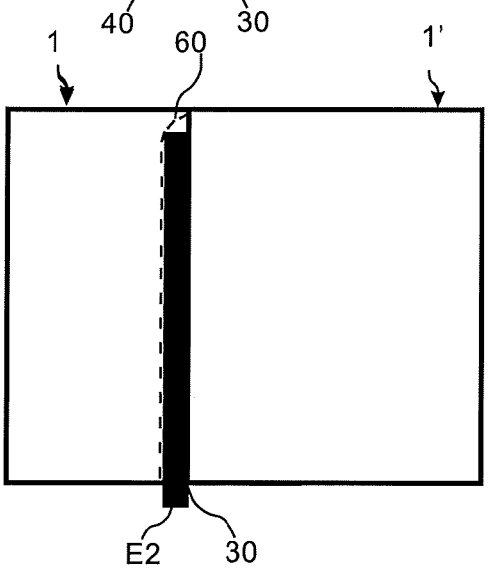
Figure 6C:
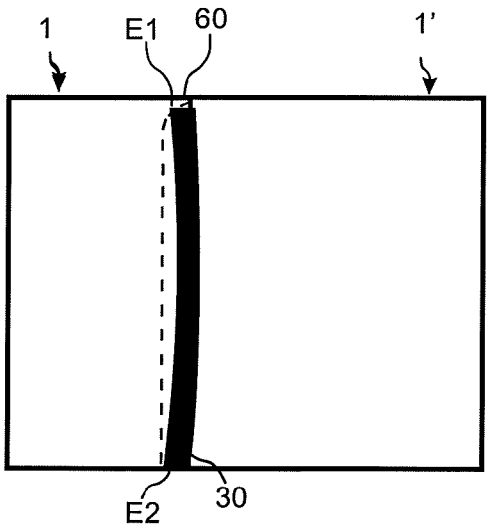

Another embodiment is shown in top views in FIGS. 6a-c. The embodiment comprises an insertion groove 40 with a sidewall 60 formed at a third edge, which is adjacent the first edge, of the first building panel 1. An opening of the insertion groove 60 is formed at the forth edge, which is opposite the third edge and adjacent the first edge, of the first building panel 1. A pressing part E2 may protrude through the opening of the insertion groove. When the first and the second edge are in a locked position a force is applied at the pressing part E2. The force presses an inner part E1 of the tongue 30 against the sidewall 60. The force bends the tongue 30 and a part of the tongue is pushed into the tongue groove 20 at the second edge of the second building panel 1'.

Figure 7A:
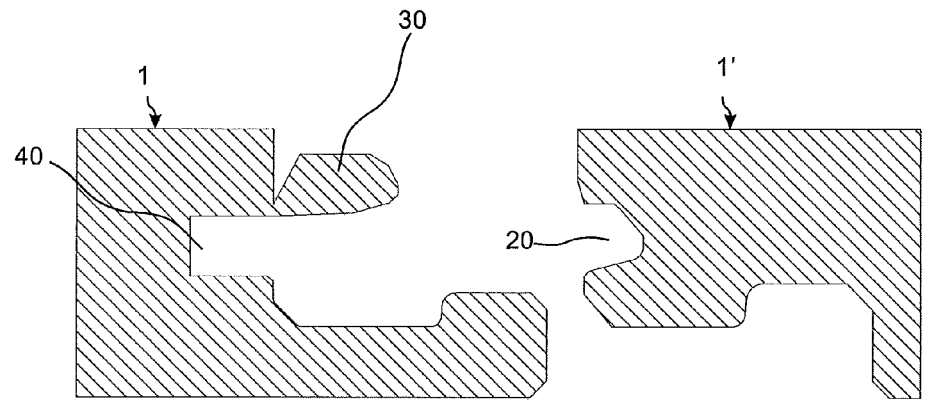
FIGS. 7a-c shows an embodiment of an assembling of an embodiment of the building panels.
Figure 7B:
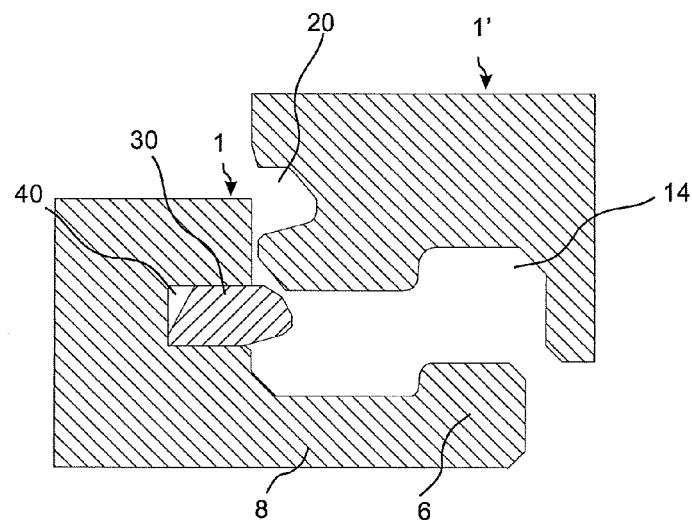
Figure 7C:
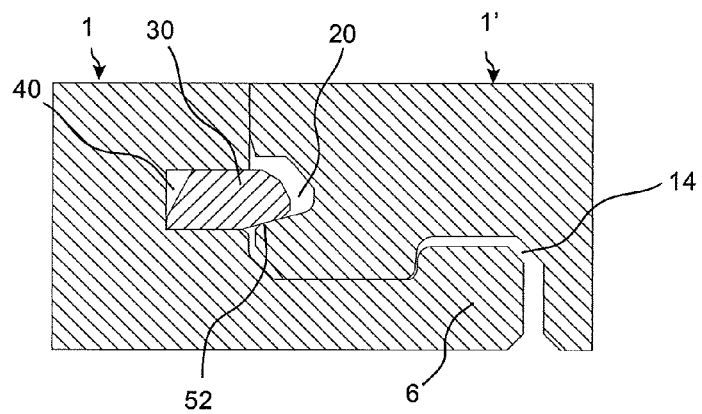
Figure 8A:
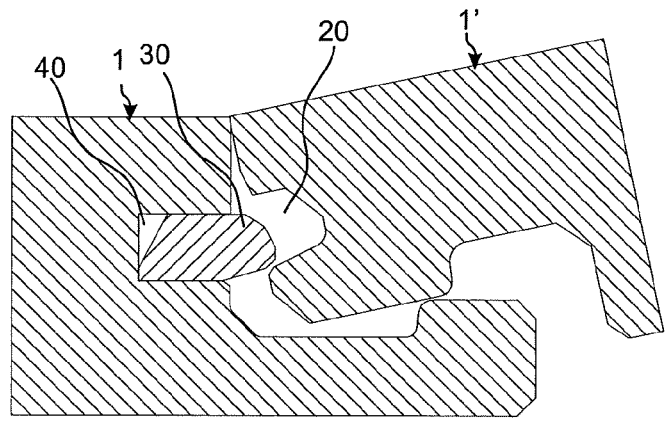
FIGS. 8a-c shows an embodiment of an assembling of an embodiment of the building panels.
Figure 8B:
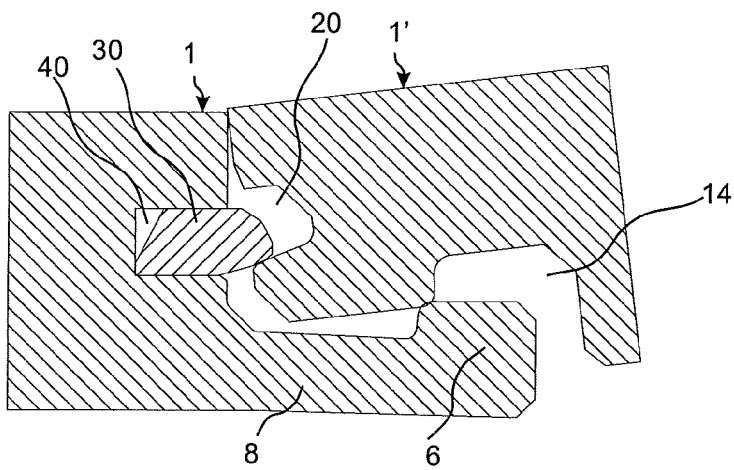
Figure 8C:
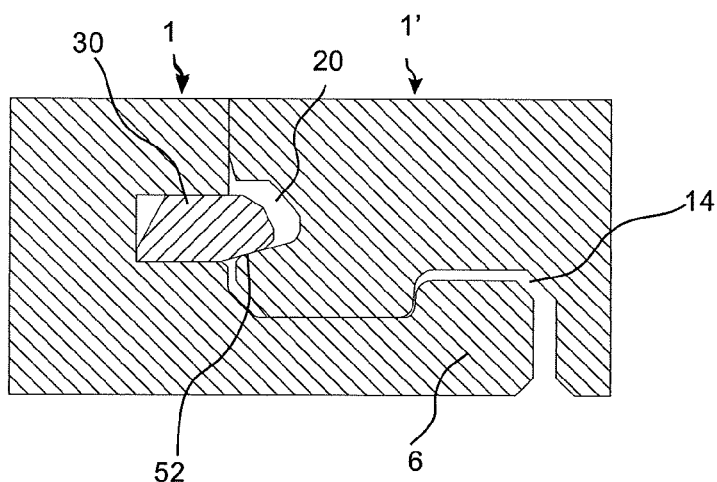

Further embodiments are shown in cross sections in FIGS. 7a-c and 8a-c. The tongue 30 and the insertion groove 40 are formed of material of the first edge. The width of tongue 30 is greater than the depth of the insertion groove 40 to obtain a tongue with protruding part that protrudes outside the upper edge of the first edge when inserted into the insertion groove 40. If the edge material is an elastic material, such as plastic or vinyl, the tongue may be compressed, such that the protruding part is pushed into the insertion groove, and thereby enable a vertical assembling as shown in FIGS. 7b-c.

If the tongue is not compressible and enables a vertical assembling as shown in FIGS. 7b-c, the first and the second edge may be assembled by an angular movement as is shown in 8a-c. The tongue 30, which may be a fixed tongue, which may be arranged firmly in the insertion groove 4, if the first and the second edge are intended to be assembled by an angular movement.

Figure 9A:
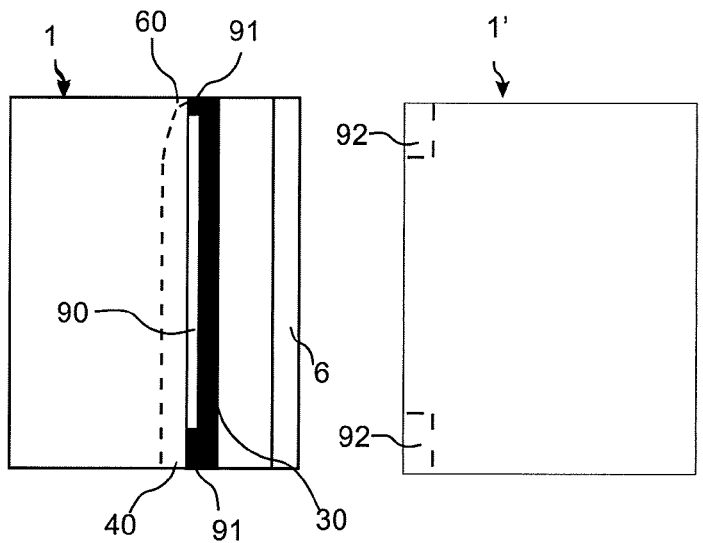
FIGS. 9a-c show top views of an embodiment of the building panels.
Figure 9B:
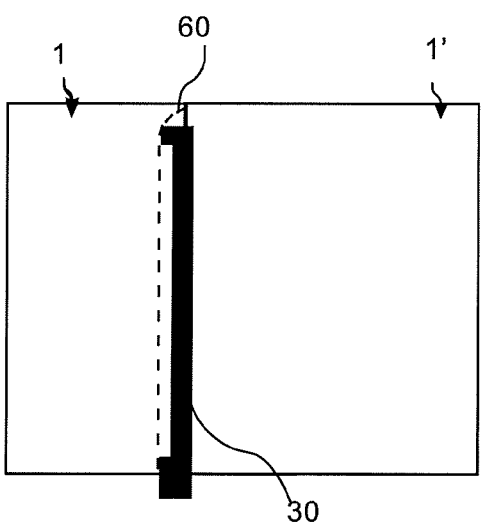
Figure 9C:
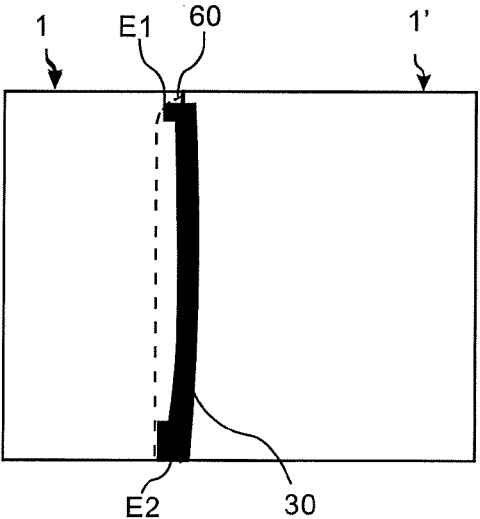

FIGS. 9a-c show a top view of an embodiment of the disclosure in which an inner groove 90 is formed throughout the tongue 30, between the tongue and the first edge of the building panel, in order to obtain an embodiment of a resilient tongue part. The inner groove extends in the longitudinal direction of the tongue and between a first and a second protruding part 91 of the tongue 30, at the third and the fourth edge of the building panel respectively. The resilient tongue part extends from the first to the second protruding part. Before the tongue is displaced into the insertion groove the protruding parts function as connection parts as described above. A part of the tongue extends outside the insertion groove when the tongue is displaced into the insertion groove. The second building panel 1' is provided with recesses 92 in the lower lip of the tongue groove at positions that correspond to the first and the second protruding part 60, as is shown in FIG. 9a. The recess enables the second building panel to be assembled to the first building panel by a vertical motion. The resilient part is pushed into the insertion groove during the vertical motion. When the first and the second building panel are in a common horizontal plane, the resilient part springs back and into the tongue groove and provides for vertical locking of the first and the second building panel. As is shown in FIGS. 9b-c, if the insertion groove is provided with the side wall 60 and the opening as described for the embodiment shown in FIG. 6a-c this embodiment may comprise a further locking step comprising applying a force at the pressing part E2. The force presses an inner part E1 of the tongue 30 against the sidewall 60. The force bends the tongue 30 and a part of the tongue is pushed into the tongue groove 20 at the second edge of the second building panel 1'.

The invention claimed is:

1. A set of building panels, including a mechanical locking system comprising:
   a tongue at a first edge of a first building panel, cooperating with a tongue groove at a second edge of an adjacent second building panel, for vertical locking of the first and second building panels, wherein
   the tongue is produced of the same material as the first edge and is at least partly positioned in an insertion groove at the first edge,
   the tongue is displaceable in the insertion groove to enable a vertical assembling of the first edge and the second edge, and
   the tongue is configured to be compressed during the vertical assembling,
   wherein a lower part of the tongue includes a first broken surface and an upper edge of the first edge includes a second broken surface, the first and second broken surfaces having been formed by breaking a connection part between the lower part of the tongue and the upper edge of the first edge.

2. The set of building panels as claimed in claim 1, wherein the tongue springs back and into the tongue groove when the first building panel and the second building panel have reached a locked position.

3. The set of building panels as claimed in claim 1, wherein the first and second edges comprise a resilient plastic material.

4. The set of building panels as claimed in claim 1, wherein the first and second edges comprise a resilient vinyl material.

5. The set of building panels as claimed in claim 1, wherein the first edge and the second edge are configured to be assembled by an angular movement.

6. The set of building panels as claimed in claim 1, wherein a contact surface of the tongue groove is configured to cooperate, for the vertical locking, with a contact surface of the tongue.

7. The set of building panels as claimed in claim 6, wherein the contact surface of the tongue groove is positioned such that when the tongue springs back and into the tongue groove during the vertical assembling of the building panels, the tongue is prevented from reaching its original position.

8. The set of building panels as claimed in claim 1, wherein the locking system further comprises a locking element protruding from a locking strip at the first edge or the second edge, and a locking groove at the other of the first edge or the second edge, wherein the locking element and locking groove are configured to cooperate for locking the panels horizontally.

9. The set of building panels as claimed in claim 1, wherein the building panels are one of floor panels, wall panels, ceiling panels, and furniture components.

10. The set of building panels as claimed in claim 1, wherein the first and second edges, of which the locking system is made, comprise a core material of the building panels.

11. The set of building panels as claimed in claim 1, wherein the tongue has a length that is essentially the same as a length of the first edge.

12. The set of building panels as claimed in claim 1, wherein the insertion groove comprises a first wall, a second wall opposite the first wall, and a third wall between the first wall and the second wall, and the tongue contacts the first wall and the second wall during the vertical assembling.

13. The set of building panels as claimed in claim 1, wherein the insertion groove extends continuously along the first edge in a horizontal direction from one end of the first edge to an opposite end of the first edge.

14. The set of building panels as claimed in claim 1, wherein the tongue is configured to be compressed by a vertical movement of a protrusion of the second edge on a portion of the tongue, and the portion of the tongue is configured to be inserted into the tongue groove.

15. A set of building panels, including a mechanical locking system comprising:
   a tongue at a first edge of a first building panel configured such that, when a second building panel is located adjacent to the first building panel, the tongue will cooperate with a tongue groove at a second edge of the second building panel, for vertical locking of the first and second building panels,
   wherein the tongue is produced of the same material as the first edge,
   wherein the tongue is configured to be compressed during a vertical assembling of the first edge and the second edge, wherein a connection part is provided between a lower part of the tongue and an upper edge of the first edge, and wherein the connection part is configured to break by displacement of the tongue at least partly into an insertion groove located at the first edge to enable a vertical assembling of the first edge and the second edge when the second building panel is located adjacent to the first building panel.

16. The set of building panels as claimed in claim 15, wherein the insertion groove is formed to be completely offset in a horizontal direction from an outer shape of the tongue.

17. The set of building panels as claimed in claim 15, wherein parts of an outer shape of the tongue are formed at an upper part of the first edge, above the insertion groove, the insertion groove is formed below the upper part of the first edge, and the tongue is configured to be displaced downwards and into the insertion groove.

\* \* \* \* \*